(12) United States Patent
Klonowski, III (10) Patent No.: US 7,448,123 B2
(45) Date of Patent: *Nov. 11, 2008

(54) METHOD OF MOUNTING A CONCEALED EUROPEAN HINGE

(76) Inventor: Stanley B. Klonowski, III, 450 N. May St., #3113, Mesa, AZ (US) 85201

( * ) Notice: Subject to any disclaimer, the term of this patent is extended or adjusted under 35 U.S.C. 154(b) by 78 days.

This patent is subject to a terminal disclaimer.

(21) Appl. No.: 11/264,263

(22) Filed: Oct. 31, 2005

(65) Prior Publication Data

US 2006/0048369 A1    Mar. 9, 2006

Related U.S. Application Data

(63) Continuation of application No. 10/945,819, filed on Sep. 20, 2004, now Pat. No. 6,959,498.

(60) Provisional application No. 60/580,884, filed on Jun. 18, 2004.

(51) Int. Cl.
*B23Q 3/00* (2006.01)
(52) U.S. Cl. ....................................... 29/464
(58) Field of Classification Search ............... 29/464, 29/428, 11, 281.1; 33/194, 197, 667
See application file for complete search history.

(56) References Cited

U.S. PATENT DOCUMENTS

| 1,224,302 | A | 5/1917 | Johnson |
|---|---|---|---|
| 2,634,507 | A | 4/1953 | Boatwright |
| 2,675,626 | A | 4/1954 | Boatwright |
| 3,184,859 | A | 5/1965 | Patrick |
| 4,400,886 | A | 8/1983 | Bindschatel |
| 4,686,769 | A | 8/1987 | Rock et al. |
| 4,873,769 | A | 10/1989 | Casanave |
| 5,042,543 | A | 8/1991 | Carey |
| 5,064,319 | A | 11/1991 | Ericksen |
| D395,246 | S | 6/1998 | Carey |
| 5,762,115 | A | 6/1998 | Shouse |
| 5,781,966 | A | 7/1998 | Ferrari et al. |
| 5,964,010 | A | 10/1999 | Huber |
| 6,145,164 | A | 11/2000 | Ferrari et al. |
| 6,468,007 | B2 | 10/2002 | Coleiro |
| 6,560,820 | B2 | 5/2003 | Heisig et al. |
| 6,694,568 | B2 | 2/2004 | Baer |
| 6,732,409 | B2 | 5/2004 | Baer |
| 6,959,498 | B1 * | 11/2005 | Klonowski, III ............. 33/194 |
| 2001/0020317 | A1 | 9/2001 | Heisig et al. |
| 2003/0000091 | A1 | 1/2003 | Havenstein et al. |
| 2004/0031204 | A1 | 2/2004 | Thompson |

* cited by examiner

*Primary Examiner*—John C Hong
(74) *Attorney, Agent, or Firm*—The Inventors Champion; David E. Allred (57) ABSTRACT

A hinge base plate mounting tool includes a substrate having an inner wall forming an opening through the substrate for receiving and holding a hinge base plate. The inner walls are configured to frictionally engage and hold the base plate against inadvertent slipping out so that the base plate may be placed in the opening and supported in a predetermined position by the base plate mounting tool while fasteners are engaged to mount the base on a receiving wall of a cabinet. The base plate mounting tool is supported in the predetermined position by engagement of a first stop for positive depthwise location of the tool and the base. The base plate mounting tool may be supported in the predetermined position by engagement of a second stop with a wall that adjoins the receiving wall for positive height location of the tool and the base along the receiving wall.

5 Claims, 9 Drawing Sheets

FIG. 7

METHOD OF MOUNTING A CONCEALED EUROPEAN HINGE

This application is a continuation of the earlier patent application entitled "HINGE BASE PLATE MOUNTING TOOL," Ser. No. 10/945,819, filed Sep. 20, 2004, and issued as U.S. Pat. No. 6,959,498 on Nov. 1, 2005, which claims priority to an earlier provisional patent application entitled "HINGE BASE BLATE MOUNTING TOOL," Ser. No. 60/580,884, filed Jun. 18, 2004, the disclosures of which are hereby incorporated herein by reference.

BACKGROUND OF THE INVENTION

1. Technical Field

This invention generally relates to a hinge base mounting tool, and more particularly to a non-continuous hinge base plate mounting tool.

2. State of the Art

Several templates have been developed for marking doors and jams for placement of hinge fasteners and hinges themselves. Templates for marking locations for hinges for subsequent removal of wood to form recesses for leaves of a hinge are also known. These devices have a variety of stops including adjustable stops, many of which are provided by complex mechanisms.

Very little has been done in the area of hinge base plate mounting tools. The only activity in this specific area appears to have been directed to mounting of continuous hinges that have very distinct elongate structure. As such, the base plate mounting tools for this type of hinge is also very distinct and elongate. Because of the unique structure of the continuous hinges to which these base plate mounting tools are applied, specific mechanisms that are best adapted to such structures have been applied. Furthermore, the continuous hinges for which the base plate mounting tools have been developed appear to always have a pair of base plates for respective opposite ends of the continuous hinge. This in combination with the fact that longitudinal positioning of the base plates for these types of hinges is relatively unimportant has caused the heretofore known base plate mounting tools, (i.e., those configured for continuous hinges), to be very specific to that type of hinge.

DISCLOSURE OF THE INVENTION

The present invention relates to a hinge base plate mounting tool including a substrate for receiving a hinge base plate, wherein the base plate may be inserted into an opening in the substrate. With the base plate held in the base plate mounting tool, the substrate may be placed on a cabinet wall in a location corresponding to a proper position for the base plate. Holes can be pre-drilled through screw receiving holes in the base plate while the mounting tool and the base plate are held in the proper position. Then the base plate may be secured by screws or the like, and the substrate may be pulled away from the base plate leaving the base plate exactly in the proper position on the cabinet. In some cases, the step of pre-drilling may be omitted. In any case, the process of inserting a base plate into the mounting tool, securing the base plate to the cabinet, and removing the mounting tool from the base plate may be repeated indefinitely so that base plates can be continuously and accurately mounted. The steps for mounting base plates are thus simplified and the speed with which base plates may be mounted is increased dramatically. No preparation including measuring is required. A user may simply insert the base plate and mount it.

As stated above, the base plate mounting tool may include a substrate for receiving a hinge base plate. The substrate may be a non-continuous hinge base plate mounting tool having an inner wall forming an opening through the substrate. The mounting tool may have at least one first stop element on the substrate at a first predetermined position relative to the opening for positioning the opening at a first predetermined distance from an edge of a receiving wall on a cabinet, for example. The base plate mounting tool may have at least one second stop element on the substrate at a second predetermined position relative to the opening for positioning the opening at a second predetermined distance from another wall or other structure of the cabinet.

It is to be understood that the present invention may be particularly beneficial in mounting hinge base plates of non-continuous hinges. While continuous hinges are typically elongate and the bases for such hinges are elongate also, the hinges that have base plates that are advantageously received and held by the base plate mounting tools of the present invention include European or concealed type hinges. Furthermore, it is to be understood that hinge base plates as used in reference to the present invention is not to be limited to bases having flat or plate like structure. Rather the term "base plate" may be replaced by the term "base", which may have any shape. Thus, the hinge base plates as described with regard to the present invention may be any hinge base that may be mounted to a receiving wall preliminarily for subsequent supporting receipt of the rest of a hinge assembly The opening may be defined by one or more inner walls extending from one surface of the substrate to another opposite surface of the substrate. The tool may further include a rib extending along at least a portion of an edge of the through opening. The rib may thus form at least a portion of the inner walls defining the opening. The opening may be configured to frictionally engage a base plate of a hinge in order to receive and hold the base plate against inadvertent falling out of the base plate. The substrate may be formed of a durable, resilient material for repeatedly receiving the base plate of the hinge without significant wear so that the tool will repeatedly hold the base plate against inadvertent falling out. Inwardly projecting protrusions may be integrally formed on the inner wall for frictionally engaging the hinge base plate in an interference fit. Alternatively or additionally, the tool may include other mechanisms for retaining the base plate in position during placement and/or mounting thereof.

The first stop element may include a protrusion and the protrusion may extend outwardly from a plane of the substrate. The first stop element may be one of a plurality of first stop elements located at a plurality of first predetermined positions relative to the opening. One or more of the plurality of first predetermined positions may be at a respective predetermined distance from the opening generally equal to the other distance(s). Alternatively or additionally, one or more of each of the plurality of first predetermined positions may be at a respective predetermined distance from the opening distinct from at least one other distance defined by a position of another of the first stop element relative to the opening.

An end edge of the substrate may form the second stop element, and the end edge may lie generally in the plane of the substrate. The second stop element may be one of a plurality of second stop elements located at a plurality of second predetermined positions relative to the opening. At least one of the plurality of second predetermined positions may be at a respective predetermined distance from the opening generally equal to the other distances defined by the positions of at least another second stop element relative to the opening. Alternatively or additionally, at least one of the plurality of second predetermined positions may be at a respective predetermined distance from the opening distinct from at least one other of the distances defined by the positions of the second stop elements relative to the opening. The substrate may further include a mark on the substrate for alignment with a feature or mark on the cabinet. Positioning the tool and base plate in this way may be done instead of or in addition to positioning with the second stops. The mark may include a center line that is aligned with a center of the opening. This center line thus corresponds to a center of the base plate and is related to the position of the door boring for hinge placement on the doors. (See the instructions included herewith in the appendix filed herewith.)

The opening may be one of a plurality of openings extending through the substrate. The tool may include a grip portion extending on a side of the first stop element opposite to the opening. The grip portion may lie generally in a plane of the substrate. The grip portion may include structure for facilitating gripping of the substrate. The tool may include strengthening ribs extending along the substrate.

The first stop may be one of a pair of first stops that extend out of a plane of the substrate on opposite sides of the substrate in a hilt configuration. The substrate may include a handle portion and a blade portion. The opening may be disposed in the blade portion.

The opening in the substrate may be complimentary to the base plate to be mounted. For example, the opening may be substantially the same shape and size as the base plate.

The present invention may include a kit having at least one hinge base plate mounting tool. The kit may include a plurality of base plate mounting tools in accordance with the present invention. The plurality of tools each may have at least one opening therethrough at a position relative to first and/or second stops that is different from the other tools in the kit. One or more of the plurality of tools may have a visual indicator for ease in distinguishing the tools from each other. Such visual indicators may be molded into the substrates, may be provided as a color in or on the substrate, or may be applied to a surface of the tool.

The present invention includes a method of mounting a hinge base plate in a predetermined position for receipt of a hinge thereon. The method may include the steps of placing a hinge base in an opening in a hinge base plate mounting tool and positioning the hinge base plate mounting tool on a receiving wall in a predetermined position. The method may also include engaging fasteners through the hinge base plate and into the receiving wall. The method may include removing the hinge base plate mounting tool after the step of engaging the fasteners.

In the method of mounting, the step of positioning may include abutting a first stop against an edge of the receiving wall. The step of positioning may also include abutting a second stop against an adjoining wall. The step of positioning may include aligning a mark on the mounting tool with a mark on the receiving wall. The method may include a preliminary step of selecting the hinge base plate mounting tool from among a plurality of mounting tools. The step of selecting may further include selecting the hinge base plate mounting tool based on a depth at which it is desired to place the hinge base plate in a cabinet.

The method of mounting may include a preliminary step of removing a portion of the hinge base plate mounting tool in order to provide a new edge at a predetermined distance from the opening.

The first and second stops may each be one of a plurality of first and second stops. The method may further include selecting a first or a second stop to be abutted with the receiving wall or an adjoining wall in order to position the hinge base plate at a position corresponding to the distance of the selected stop from the opening. Alternatively or additionally, the opening may be one of a plurality of openings in a given substrate. The method may thus include selectively placing the hinge base plate in one of the plurality of openings.

The method may also include repeatedly placing hinge base plates in the hinge base plate mounting tool for repeatedly positioning hinge base plates on receiving walls during ongoing manufacturing processes. The step of repeatedly placing may include placing the hinge base plates in the opening by repeatedly pressing the hinge base plates into the openings against the frictional resistance of an interference fit. The step of repeatedly placing may include placing hinge base plates in the opening more than 100,000 or more than 200,000 times, (depending on the material used), before the opening becomes worn to an extent at which the inner walls of the opening no longer hold the hinge base plate against inadvertent slipping out.

In another simple form, the invention may include a method of mounting a concealed European hinge. The method may include placing a hinge base in a through opening of a base mounting tool. The hinge base is automatically positioned at a predetermined depth by abutting a first stop against an edge of a receiving wall. The hinge base is automatically positioned at a predetermined height by abutting a second stop with a wall that adjoins the receiving wall. The hinge base is accurately mounted by maintaining the first and second stops in abutting relation to the walls while attaching the hinge base to the receiving wall. Then the tool is removed from the hinge base leaving it in the exact position it belongs. This process may be repeated for as many hinge bases as need mounting. The method may also include boring a hinge cup holes in a door at a position relative to an edge of the door corresponding to a distance from the second stop to a vertical center of the hinge base plus an overlay or minus a clearance of the door relative to the wall that adjoins. Then the hinge may be attached to the door and to the hinge base. Doors may be bored separately and/or simultaneously based on the dimension from the second stop to a mark in the center of the mounting tool plus an overlay or minus a clearance. Thus, using the mounting tools of the present invention advantageously determines the hinge placement on the door and takes the guesswork and much of the measuring out of the process.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 1A:
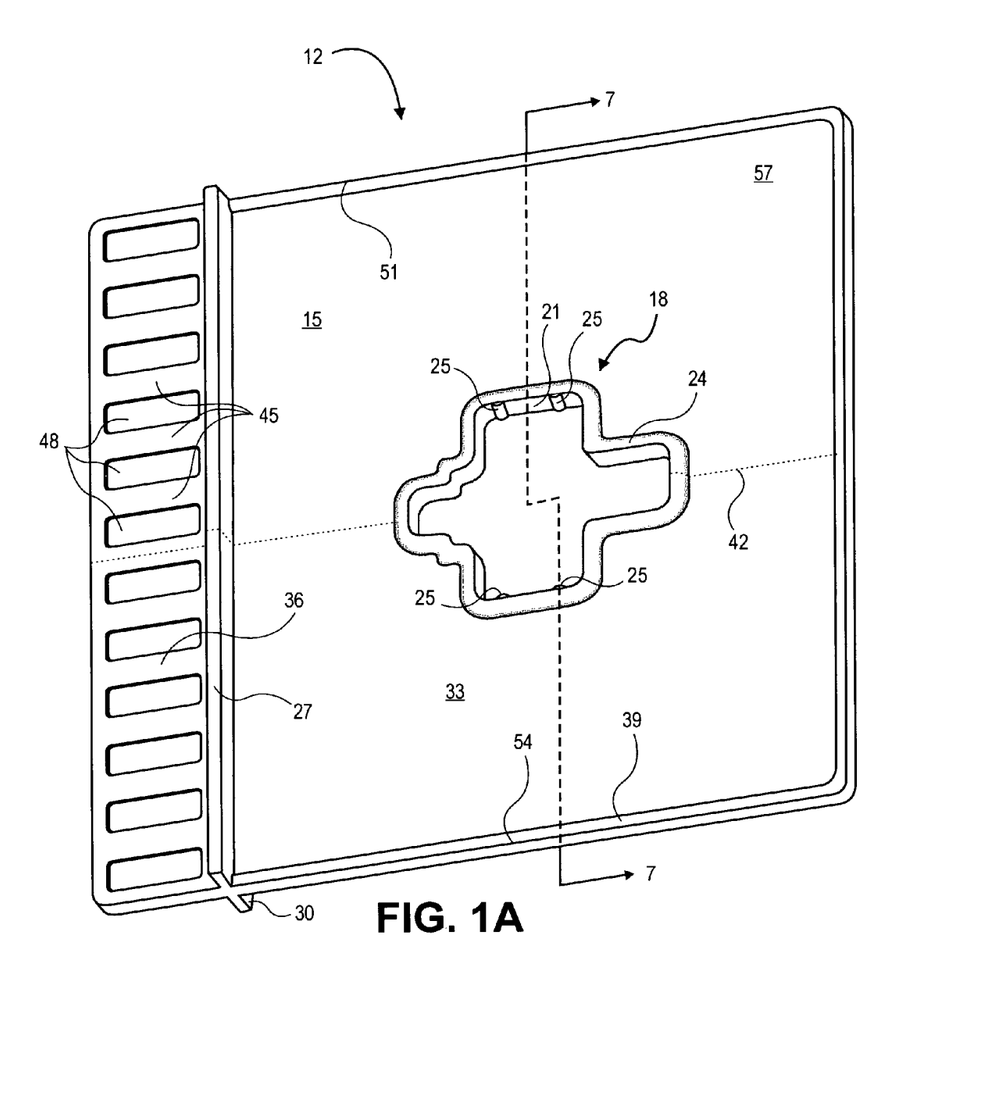
FIG. 1A is a perspective view of a hinge base plate mounting tool in accordance with a first embodiment of the present invention.

FIG. 1A is a perspective view of a hinge base plate mounting tool 12 generally formed of a substrate 15 of a relatively thin flat material. Thus, the substrate 15 generally defines the plane. An opening 18 extends through the substrate 15 and provides a socket for receiving a base plate of a hinge assembly. In FIG. 1A, the opening 18 is defined by inner walls 21 generally in a cruciform configuration. This particular configuration matchingly receives a base plate of a European or concealed style hinge assembly. However, it is to be understood that the opening 18 may be provided in any configuration for receiving and holding any of a variety of different base plates corresponding to any of various hinge assemblies available on the market today or not yet discovered.

It is to be understood that the opening 18 is to be sized and shaped in order to frictionally engage a base plate of a hinge assembly and hold such a base plate against inadvertent falling out thereof. Thus, the opening 18 is configured to form an interference fit with the base plate and to hold it generally within the confines of the inner wall 21 forming the opening 18. As shown in FIG. 1A, a rib 24 may be provided along a perimeter of the opening 18. The rib 24 may form a portion of the inner wall 21 and broaden a surface on which the hinge base plate may bear when it is being held within the opening 18.

One or more inwardly projecting protrusions 25 may be provided on the inner wall 21 that forms the opening. The protrusions 25 may be integrally formed together with the rest of the hinge base plate mounting tool 12, or may be added on. The protrusions 25 reduce the surface area that is being immediately engaged and pressed by the hinge base plate that is inserted in the opening 12. Therefore, the forces per unit area are much higher than it would be over a more generalized area without the protrusions 25. As a result, the material of the protrusions gives enough to enable the hinge base plate to be inserted against the resistance of friction and the stiff resilience of the material, which may be a generally hard plastic. With a hard plastic material, frictional engagement along a large portion of the inner wall 21 may present frictional forces that inhibit ease of insertion and removal of the base plate from the tool. On the other hand, with a plurality of protrusions on opposite portions of the inner wall as shown in FIG. 1A, the slight resiliency of the material give way to the forces of insertion in the localized regions of the protrusions 25, and the base plate may be inserted and remove with ease. Furthermore, the base plate is held firmly under the friction and resiliency of the material.

The protrusions 25 also advantageously increase overall surface area of the inner wall 21 of which they are part. The net result of this increased surface area with only smaller portions engaged with the hinge base plates is that it reduces a tendency of the hinge base plates to tilt slightly and bind up with large portions of the inner wall 21 during insertion and removal of the hinge base plates. The protrusions 25 may be elongate in a direction transverse to the plane of the substrate. The protrusions 25 may partially or completely traverse the inner wall 21. As shown in the exemplary depiction of FIG. 1A, the protrusions 25 may extend substantially perpendicularly to the rib 24. These configurations of the protrusions 25 may advantageously facilitate hinge base plate insertion positioning, and removal.

The hinge base plate mounting tool 12 may have at least one first stop 27 protruding from the substrate 15 as shown in FIG. 1A. As shown, one first stop 27 may project out of the plane of the substrate 15 on one side of the hinge base plate mounting tool 12 while another first stop 30 may protrude oppositely out of the other side of the hinge base plate mounting tool. Thus, a pair of first stops 27 and 30 may form a hilt between a blade portion 33 and a handle portion 36 of the substrate 15. As may be appreciated, the opening 18 may be disposed in the blade portion 33 on an opposite side of the first stops 27 and 30 from the handle portion 36. Alternatively, two blade portions may protrude in opposite directions from the hilt formed by the first stop elements 27, 30. In this way, a single tool may have a distinct opening configuration or position on each of the blade portions. In any case, the first stops 27 and 30 are configured to abut a front edge of a cabinet wall and thereby inhibit further movement of the tool 12 in a depth direction of the cabinet. Thus, the first stops positively locate the opening at a first predetermined position relative to the front edge of the cabinet.

As shown in FIG. 1A, a rib 39 may be provided along a peripheral edge of the blade portion 33 in order to provide a smooth strengthened edge. A mark 42 may be provided on the surface of the hinge base plate mounting tool 12 in order to facilitate alignment of the tool 12 during use, as will be described in greater detail below. The mark 42 may be provided as a score line, may be molded as an indentation formed directly in the material of the mounting tool 12, or may be applied to a surface of the tool 12. As shown, the mark 42 is aligned with a center of the cruciform opening 18. The mark 42 may extend all the way around the substrate 15 or may extend only along a portion of the surface of the substrate. The handle portion 36 may include ribs 45 having recesses 48 therebetween, which together form a grip that has the advantage of inhibiting slippage of the mounting tool 12 in the hand of a user. At the same time, the handle portion may be strengthened by the ribs 45.

Figure 1B:
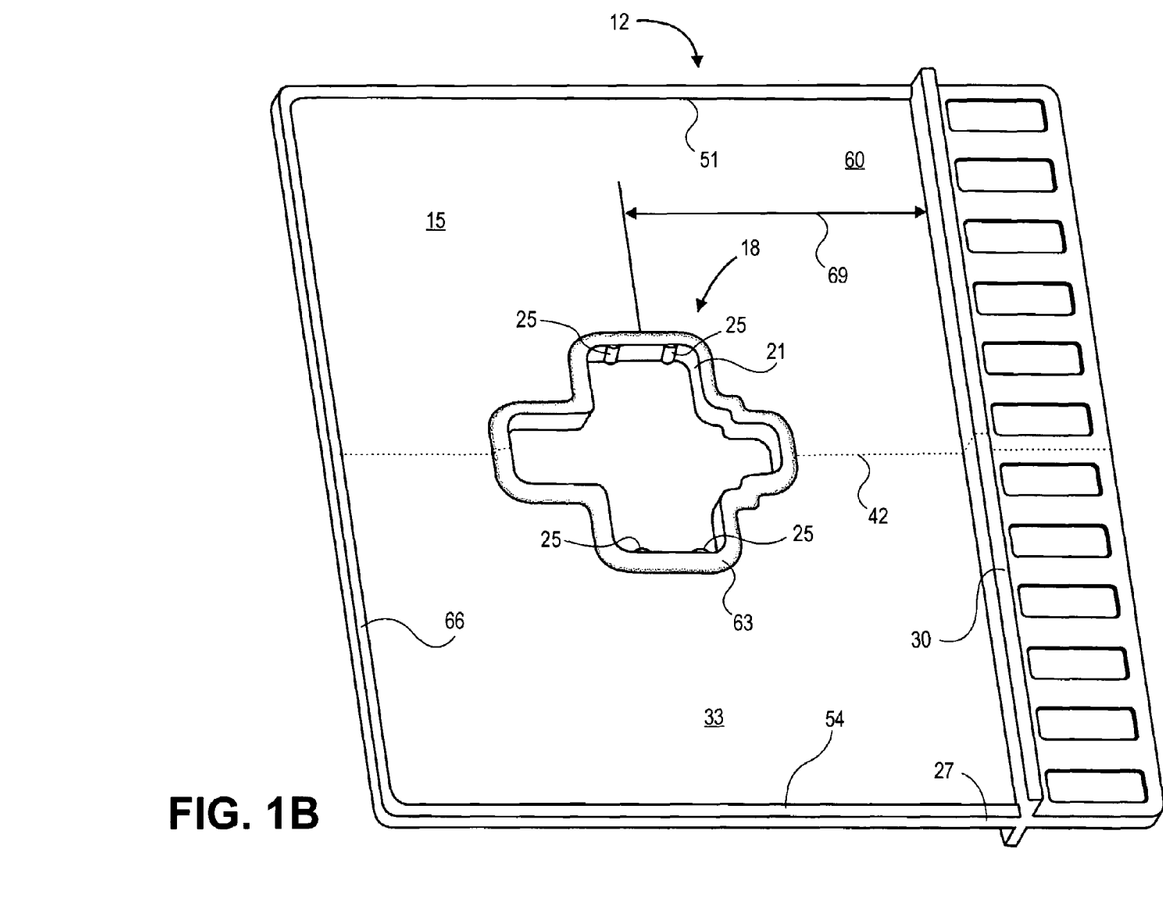
FIG. 1B is another perspective view of the hinge base plate mounting tool of FIG. 1A.

Upper and lower edges 51, 54 of the substrate 15 provide respective second stops for positively positioning the hinge base plate mounting tool 12 of the present invention. In particular, the second stops may be placed to abut walls that are adjacent and adjoining the wall of the cabinet to which the hinge base plate is being mounted. In such an abutting position, the second stops provide a positive position for the opening relative to the adjoining wall. FIG. 1A shows a first side 57 of the hinge base plate mounting tool 12. As shown in FIG. 1B, a second side 60 of the tool 12 may generally have a mirror image of the structure shown and described with regard to the first side 57 of the tool 12. Thus, the first stop 30 is shown protruding out of the page in this view. Another rib 63 may be provided along the periphery of the opening 18 and may form a portion of the inner wall 21. Likewise, a rib 66 may extend along the periphery of the blade portion 33 of the second side 60 of the substrate 15.

In the embodiment of FIGS. 1A-1B, as in other embodiments, the first stops 27, 30 may be positioned at the same first predetermined position from the opening 18. Likewise, the opening may be centered between the upper and lower edges 51, 54, to provide the opening at a second predetermined distance from both of the second stops. In this way, the tool 12 is fail safe and may be turned over or used on opposite walls of a cabinet without the risk of positioning the hinge base plate erroneously. Alternatively expressed, the tool is symmetrical about at least two planes. This feature taken together with the fact that the inner wall 21 is non-stepped in a direction of insertion provides an exceedingly fail safe tool. That is, the hinge base may be inserted from either side of the substrate 15. The tool may be turned over without loss of the offsets from the front edge of the receiving wall and from the wall that adjoins the receiving wall.

The opening 18 is provided at a position in the substrate 15 that yields an offset 69 from the first stop 30 for a line generally corresponding to mounting screw holes in a base plate of a hinge assembly for which the base plate mounting tool 12 was configured. As shown, the first stops 27 and 30 provide the same offset distant 69 regardless of the orientation of the hinge base plate mounting tool 12 during use. However, it is to be understood that the first stops 27 and 30 could be offset relative to each other along the plane of the substrate 15 in order to provide a user with the option of selecting a depth at which to mount the hinge base plate by selectively orienting one of the first stop elements 27 and 30 to engage a receiving wall of a cabinet on which the base plate is to be mounted. Furthermore, while the first stop elements 27 and 30 are shown as generally continuous elements along a height of the substrate 15, one or more short stop elements could be provided in the place of the first stop elements 27 and 30 without departing from the spirit and scope of the present invention.

Figure 2A:
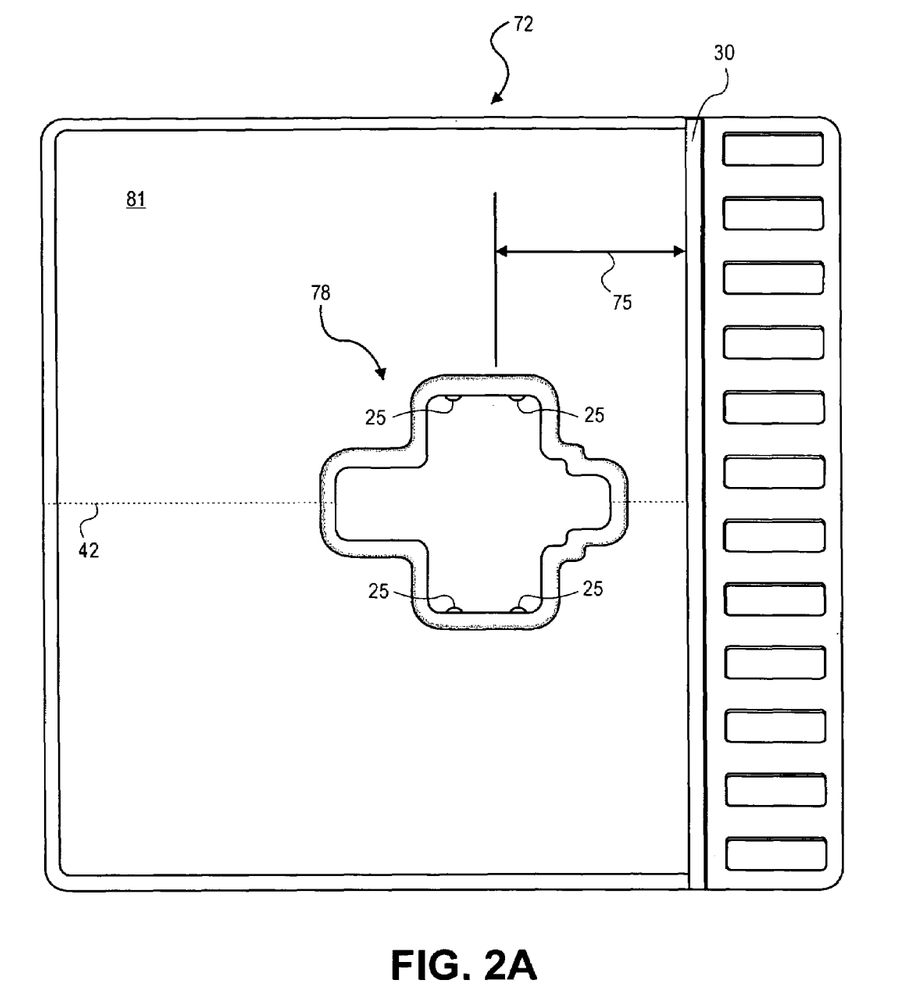
FIG. 2A is a side plan view of a hinge base plate mounting tool in accordance with a second embodiment of the present invention.

FIG. 2A is a side plan view of a hinge base plate mounting tool 72 in accordance with a second embodiment of the present invention. As may be appreciated, the offset distance 75 of a line corresponding to mounting screw holes of the base plate to be mounted is shorter than in the embodiment of FIGS. 1A-1B. This is because the opening 18 of FIG. 1A-1B is located at a depth or distance 69 in order to accommodate inset doors on a cabinet, for example. On the other hand, the offset distance 75 shown in FIG. 2A corresponds to proper placement of the hinge base plate for overlay doors, for example. Thus, an opening 78, (analogous to the opening 18 shown and described in FIGS. 1A-1B), may be provided in a substrate 81 of the hinge base plate mounting tool 72 at a smaller distance from the first stops as shown in FIG. 2A.

Figure 2B:
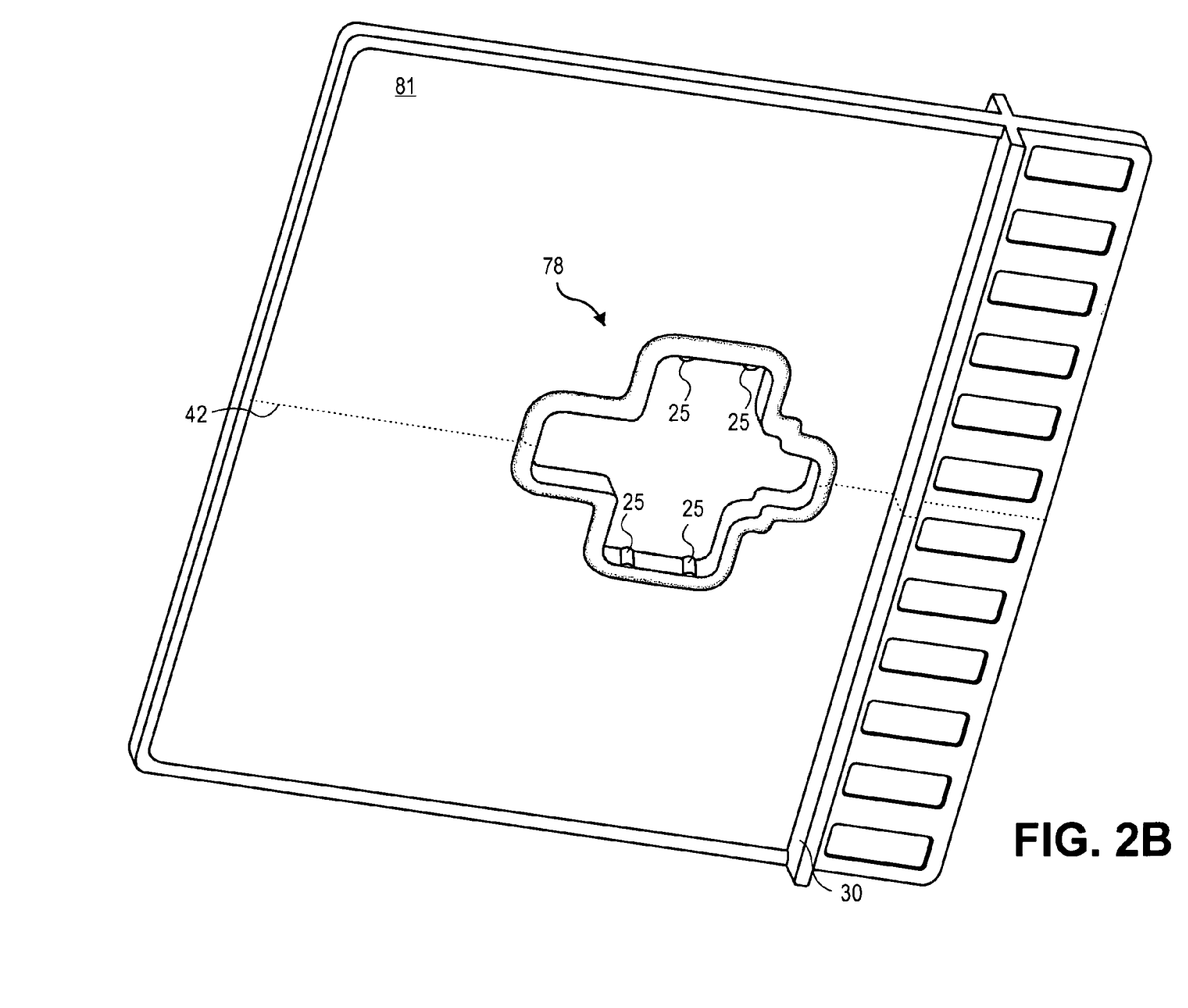
FIG. 2B is a perspective view of the hinge base plate mounting tool of FIG. 2A.

Other structural details of the embodiment of FIGS. 2A and 2B, is similar and analogous to the embodiment shown and described with regard to the embodiment of FIGS. 1A-1B above. While FIG. 2B does not show the reverse side of the mounting tool 72, it is to be understood that similar structure to that shown in FIG. 1A may be provided on the reverse side of the tools shown in the FIGS. 2A-2B. On the other hand, it is to be understood that the hinge base plate mounting tools 12 and 72 may be formed without many of the details shown in the FIGS. of 1A through 2B. For example, ribs around a periphery of the openings 18 and 78 may be omitted without departing from the spirit and scope of the invention. Likewise, the rib around the blade portions of the tools 12 and 72 may be omitted. The handle portions may be provided in other configurations without departing from the spirit of the invention. For example, the handle portions need not lie in the same plane with the substrates 15 and 81. On the other hand, the mounting tool of the present invention needs to have at least one first stop element. Likewise, the mounting tools need to have at least one positive second stop element. With both of a first and a second stop element, the mounting tool of the present invention may be advantageously used to position a base plate of a hinge assembly in both of a position relative to an adjoining wall, and a position relative to a front edge of the receiving wall for the base plate.

Figure 3:
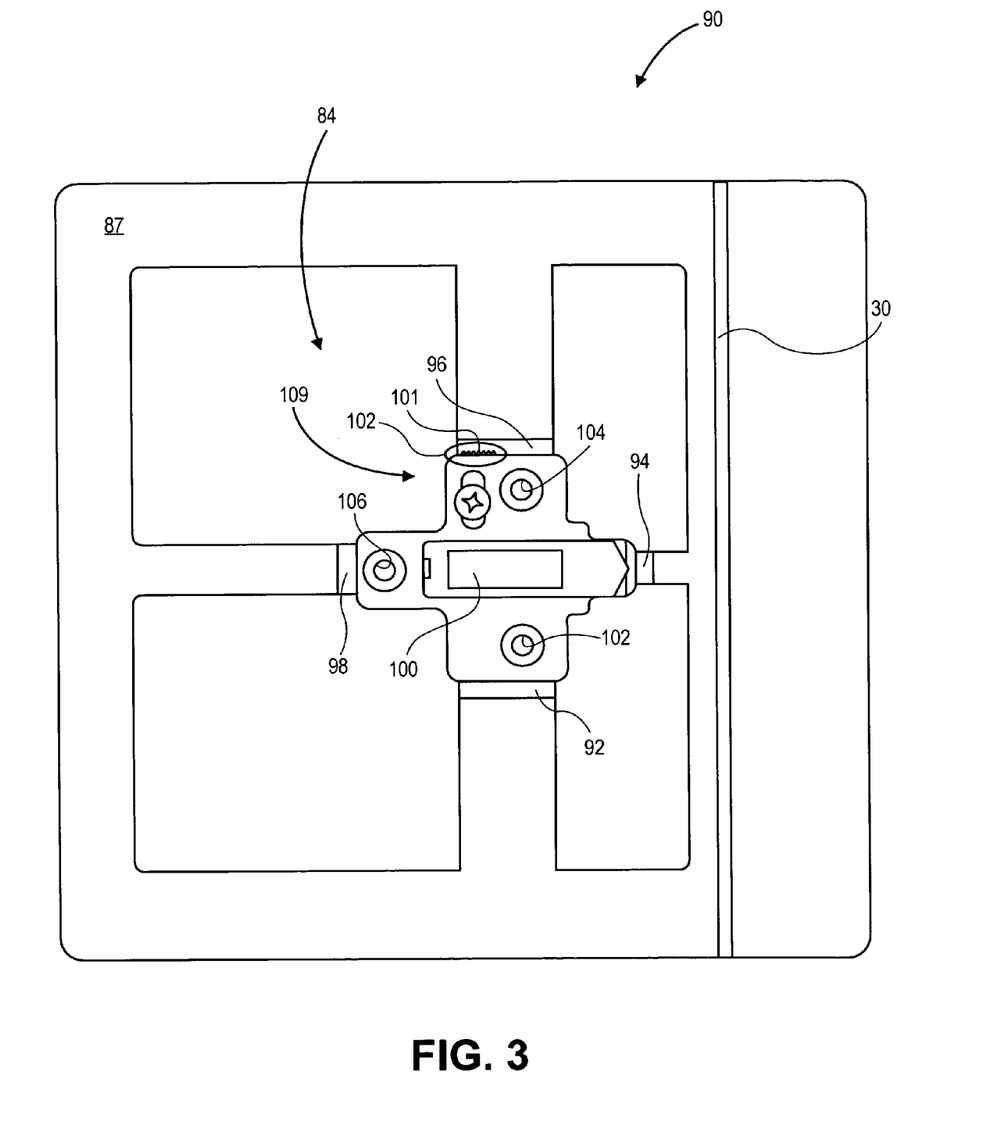
FIG. 3 is a diagrammatic side plan view of a hinge base plate mounting tool having a hinge base plate supported therein in accordance with a third embodiment of the present invention.

While FIGS. 1A-2B show openings 18 and 78 formed by an inner wall extending through the substrates 15 and 81 that generally matches a shape of the hinge base plate, it is to be understood that the shape of the opening need not match the shape of the base plate to be received therein for mounting. For example, FIG. 3 shows an opening 84 that occupies the majority of the blade portion 87 of the hinge base plate mounting tool 90 in accordance with a third embodiment of the present invention. As shown in FIG. 3, engagement portions 92, 94, 96, and 98 protrude inwardly and engage a base plate 100 therebetween in order to hold the base plate 100 during mounting thereof in a manner similar to that made possible by the embodiments of FIGS. 1A through 2B described above. While the embodiment shown in FIG. 3 has four engagement elements 92, 94, 96, and 98, it is to be understood that a base plate 100 could be adequately held by three engagement elements, two engagement elements, or even a single engagement element. Part or all of an inner wall that defines the opening 84 through the substrate 87 may include inwardly directed serrations 101 as shown at 102 or other gripping structure for frictionally engaging the hinge base plate 100. This structure may be pointed or rounded and may include ribs running generally perpendicular to the plane of the substrate, generally parallel to the plane, or in any other direction. Alternatively, the gripping structure in the opening may comprise bumps or may be provided on a separate element supported on the inner wall forming the opening 84. On the other hand, the substrate 87 need only have structure that engages and holds the hinge base plate 100 of a hinge assembly in place during positioning and mounting of the hinge base plate 100.

The hinge base plate mounting tool 90 of FIG. 3 is capable of holding the hinge base plate 100 in this manner. In use, one of the first stop elements 27, 30 may be abutted on a front edge of a receiving wall of a cabinet with a base plate 100 held in the opening 84 thereof. The base plate 100 is to be supported in a position in which it will be mounted and remain during use. Thus, the mounting screw holes 102, 104, and 106 may be used as a guide for drilling holes for mounting screws and/or for receiving mounting screws therethrough. Any minor adjustments required for proper positioning of the base plate 100 may be accomplished subsequently by manipulation of the adjustment mechanisms of the hinge including adjustment mechanism 109. On the other hand, the hinge base plate mounting tools of the present invention have the distinct advantage of accurately positioning the base plates 100 such that little or no adjustment will typically be required.

On the other hand, the opening may be provided at a position between those actually needed for mounting the most common thicknesses of doors in order to advantageously add versatility to a particular mounting tool. To this end, the substrate may include structure forming the openings 18, 78, 84 that will position a base plate in a middle range between those positions that will typically be needed for standard door thicknesses with a particular hinge assembly. Then the position of the hinge plate and/or door may be adjusted by the adjustment mechanisms of the hinge assembly. For example, a typical European hinge assembly is capable of side-to-side, front-to-back, and up-and-down adjustment via the adjustment mechanisms of the hinge themselves. Thus, for inset doors, a hinge base plate mounting tool 12 in accordance with the embodiment of FIGS. 1A-1B may be configured to locate the hinge base plate 100 at a predetermined depth between the two most common standard thicknesses of doors. This position will be deeper than the standard depth for full overlay doors by that predetermined depth. As a specific example, as compared with an offset from a front edge of the receiving wall of 37 millimeters for an overlay door, a corresponding offset of 37 millimeters plus $^{13}/_{16}$ of an inch may be provided in order to hold a base plate of an inset door. This additional predetermined depth of $^{13}/_{16}$ inch is at a mid range between the ideal positions for ¾ inch thick doors and ⅞ inch thick doors for inset door applications. Thus, a single hinge base plate mounting tool 12 may be used to properly locate hinge base plates for both common door thicknesses of ¾ inch and ⅞ inch thicknesses. Then the hinge adjustment mechanisms may be manipulated to account for the approximately ¹⁄₁₆ inch deviation in either direction from the ideal position.

Figure 4:
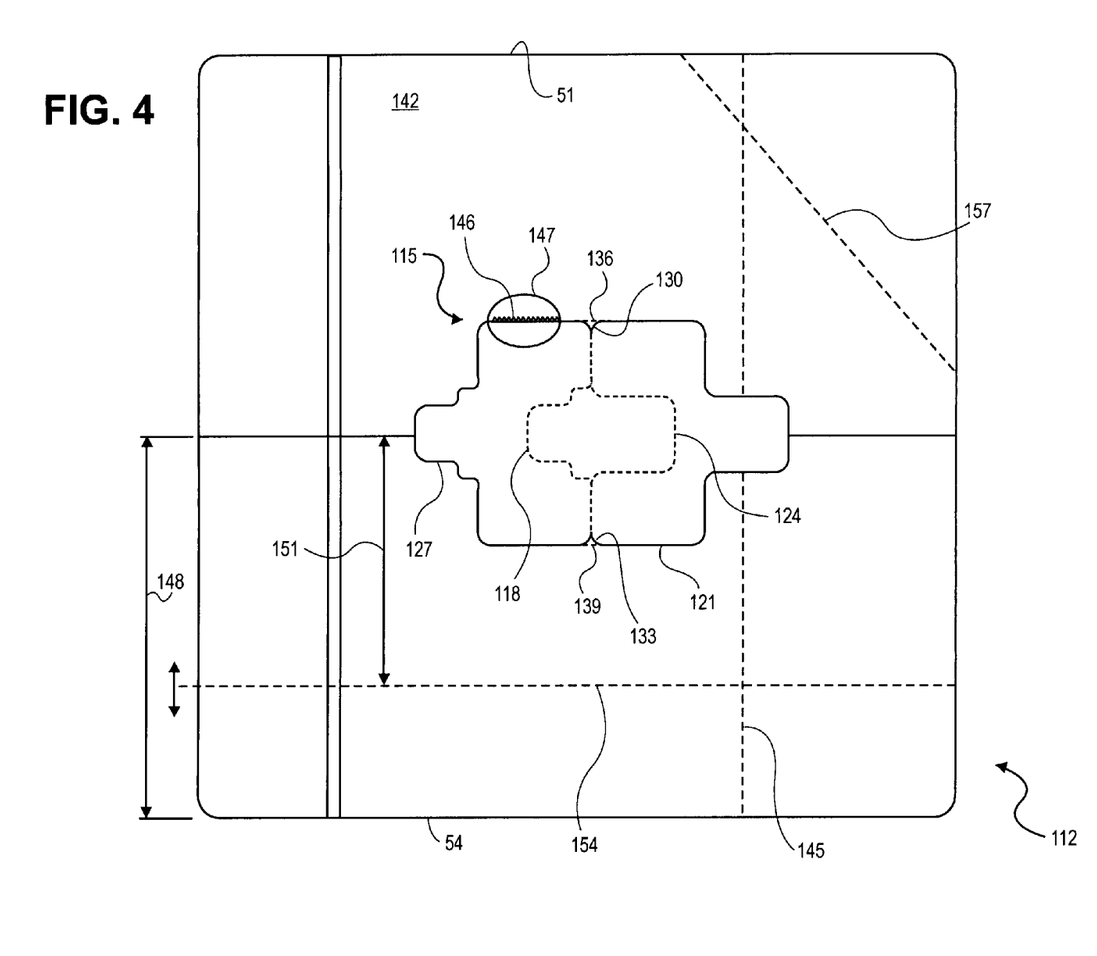
FIG. 4 is a diagrammatic side plan view of a hinge base plate mounting tool in accordance with a fourth embodiment of the present invention.

FIG. 4 shows a hinge base plate mounting tool 112 in accordance with a fourth embodiment of the present invention. It is to be understood that any of the features and structures shown and described with regard to FIGS. 1A through 3 may be included in the mounting tool 112 of FIG. 4. Likewise, the features described with regard to FIG. 4 may be included with any other embodiment. For example, even though FIGS. 3 and 4 do not show ribs around the peripheries of the handle portion, blade portions, and openings, such ribs could be included in the embodiments of FIGS. 3 and 4 without departing from the spirit and scope of the invention. In particular, FIG. 4 has an opening 115 that is capable of receiving a cruciform base plate 100 similar to that shown in FIG. 3 in either of two positions. A first position is defined by solid lines generally in a right hand portion of the opening 115 and dashed lines in a center and left hand portion of the opening region 115. A second position is defined generally by the solid lines in the left hand portion of the opening 115 and the dashed lines in a center and right hand region of the opening 115. That is, dashed line 118 and a solid line 121 outline a first position in which a base plate 100 could selectively be held. On the other hand, dashed line 124 and solid line 127 define a second position in which the base plate 100 could be held. Cusps 130 and 133 may generally help to define a boundary and provide a holding mechanism for the hinge base plate 100 in each of the respective positions in the opening 115. Alternatively, the cusps 130 and 133 may be omitted as indicated by dashed line 136, 139. In any case, an opening 115 of the type shown in FIG. 4 has the advantage of enabling use of the hinge base plate mounting tool 112 for positioning and mounting base plates 100 at each of two depths in a cabinet. It is to be understood that a further additional position(s) could be provided by a modified opening through a substrate 142. Alternatively or additionally, a plurality of separate openings may be provided in the substrate 142.

While the openings 18, 78, 84, and 115 have been shown as openings formed by an endless or closed loop inner wall, it is to be understood that the openings may alternatively open out through an edge of the substrates. For example, the opening 115 of the hinge base plate mounting tool 112 in FIG. 4 could be truncated at a line 145 so that the opening 115 would have a reentrant configuration opening out through a forward edge of the tool 112. The opening need not be reentrant as long as the structure forming the opening has sufficient holding structure to keep the hinge base plate in position during placement and mounting thereof. Furthermore, part or all of an inner wall that defines the opening 115 through the substrate 142 may include inwardly directed serrations 146 as shown at 147 or other gripping structure for frictionally engaging the hinge base plate 100. This structure may be pointed or rounded and may include ribs running generally perpendicular to the plane of the substrate, generally parallel to the plane, or in any other direction. Alternatively, the gripping structure in the opening may comprise bumps or protrusions, or may be provided on a separate element supported on the inner wall that forms the opening 115. Such holding structures may be applied to all or part of any of the inner walls that form the openings through the substrates of any of the hinge base plate mounting tools of the present invention. For example, inner wall 21 shown in FIG. 1A may be serrated as shown and described with regard to region 147 of FIG. 4, or may have additional gripping structure.

While the hinge base plate mounting tools of the present invention have been shown as including generally square substrates, it is to be understood that the substrates may be provided as rectangular and elongate in a fore and aft direction or as having any of a variety of additional shapes. In particular, a pair of second stops 51 and 54 may be positioned at a distance 148 from a vertical center of the opening 115. This distance 148 may be selected to be a good standard offset from an adjoining wall for a base plate of a hinge. Such a standard distance may be three inches, for example. On the other hand, upper and lower edges forming second stop elements 51 and 54 may be provided at any distance 151 from the vertical center of the opening 115 greater or less than that shown. In fact, a user may modify a hinge base plate mounting tool of the present invention by cutting off a portion of the tool 112 along a line 154, for example. Thus, the user may select the offset that he or she desires. As may be appreciated, distinct offsets may be provided by respective second stop elements 51 and 54. Thus, a single hinge base plate mounting tool 112 may be used to selectively provide a plurality of offsets by merely reorienting the tool 112 to abut an adjoining wall with a different edge during use. By these or other methods, such as by simply selecting another tool configured for a different offset, the position of the tool in a cabinet may be adjusted. An alternative way of describing this adjustability may be that a position of the opening in a tool, or from one to another may be varied for different applications.

While the hinge base plate mounting tools of the present invention have been shown as including blades with straight front edges, the forward edges may be angled as shown at 157, or may be provided in any configuration. In particular, larger openings as shown in FIG. 3, and cut off portions as shown in FIG. 4 may provide advantages of material savings and result in lower costs in manufacturing.

Figure 5:
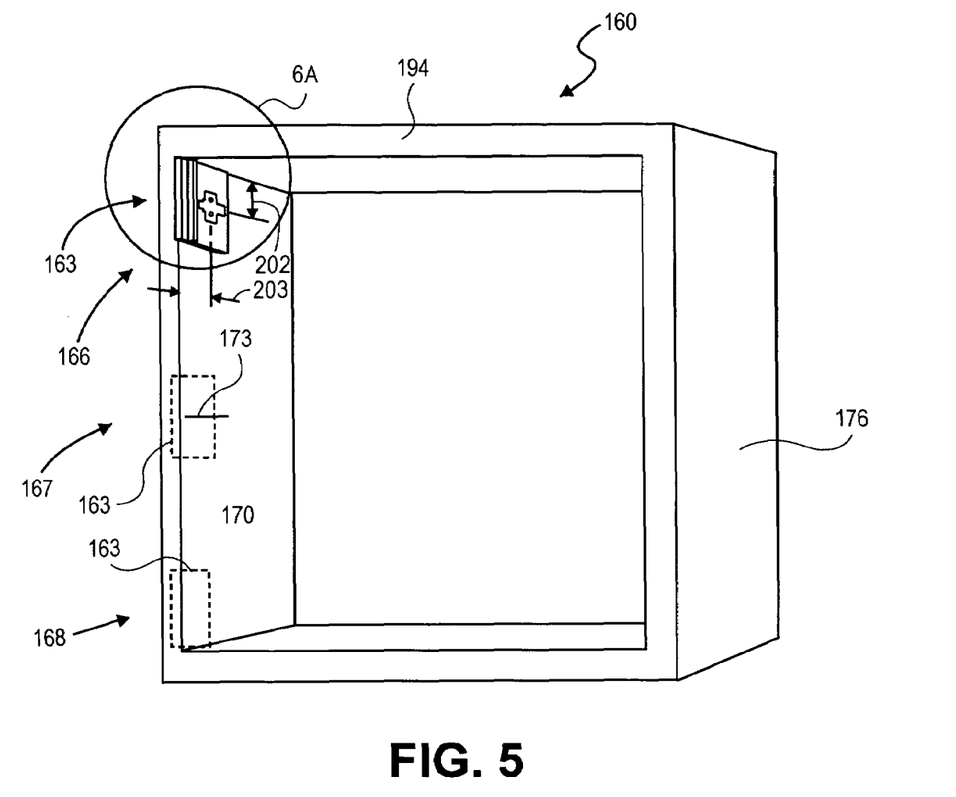
FIG. 5 is a diagrammatic perspective view depicting a method of using a hinge base plate mounting tool in accordance with the present invention.

FIG. 5 is a diagrammatic perspective view of a cabinet 160 in which a hinge base plate mounting tool 163 may be used to locate base plates of hinge assemblies. As shown, the mounting tool 163 may be positioned at a top 166, a middle 167, or a bottom 168 of a receiving wall 170 for placement and mounting of a hinge base plate in accordance with the present invention. For tall doors, a third central hinge may be required. In this case, a mark 173 may be placed at the center of the receiving wall 170. Then an alignment mark 42 (as shown in FIGS. 1A-2B) on the hinge base plate mounting tool may be aligned with the mark 173 on the receiving wall in order to properly position the hinge base plate. Any number of hinges and hinge base plates may be located along the height of the receiving wall 170. Once the base plates have been mounted on the receiving wall 170, additional base plates may be mounted on an opposite receiving wall 176.

Figure 6A:
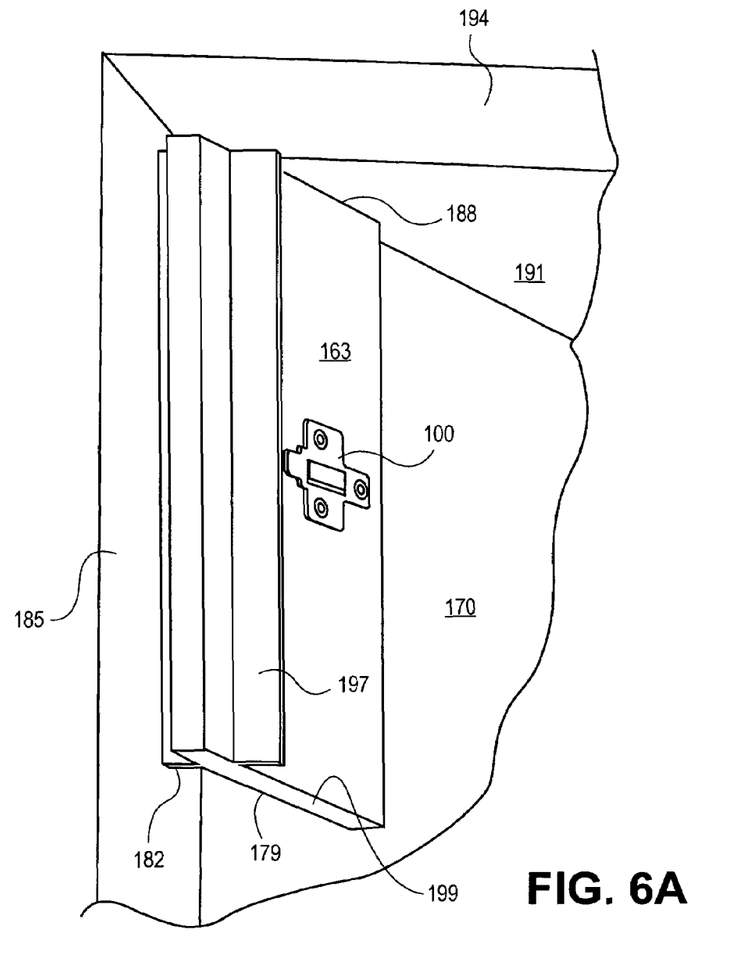
FIG. 6A is a detailed perspective view of a region 6A of FIG. 5.

FIG. 6A is a detailed perspective view of a region 6A of FIG. 5. In use, the base plate 163 is positioned with a first surface 179 flat against an inner surface of the receiving wall 170. A first stop 182 similar to those described above may be abutted against a forward edge 185 of the receiving wall 170. A second stop element 188 may be abutted against a downward facing surface 191 of an adjoining wall 194 to provide a positive vertical position for the base plate 100 relative to the adjoining wall 194. At the same time, the first stop element 182 provides a positive depth position for the base plate 100. As shown, additional first and second stop elements 197 and 199 are provided on the mounting tool 163. Similar placement of a hinge base plate 100 in the mounting tool 163, location of the mounting tool 163, and mounting of the base plate 100 may be applied at the various desired positions on the receiving walls 170 and 176 as shown in FIG. 5. Advantageously, the mirror image first and second sides of the hinge base plate mounting tool 163 and the centrally positioned opening therein result in a fail safe configuration that may be turned over between uses without risk of mounting base plates erroneously. As long as one of the first stop elements 182 and 197 are abutted against a forward edge of a receiving wall, and one of the second stop elements 188 and 199 are abutted with an adjoining wall, then the base plate 100 will be positioned and mounted accurately.

Figure 6B:
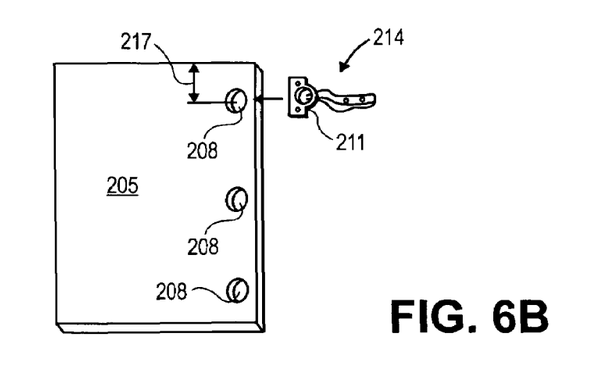
FIG. 6B is a diagrammatic perspective view depicting a method of locating hinges on a door in accordance with the present invention.

As shown in FIG. 5, selection of a particular hinge base plate mounting tool 163 determines the hinge center relative to the forward edge 185 of the receiving wall 170 and relative to an adjacent surface 191 of the adjoining wall 194. As shown in FIG. 5, a vertical offset 202 of the hinge center relative to the adjoining wall 194 may be approximately three inches. Selection and use of the tool 163 sets this hinge center relative to the adjoining walls. Likewise, the depth offset 203 of the hinge base plate relative to the forward edge 185 of the receiving wall is set by the relative position of the first stops relative to the opening as generally described above with regard to FIGS. 1A-2B. Thus, the base plate mounting tool 163 must be selected based on whether the doors to be hung are to be inset or overlay doors. Once this is established, a door 205 may be bored as shown in FIG. 6B. Boring machines that are capable of accurate production style boring of holes 208 for receipt of hinge cups 211 of European hinges 214 are known.

As depicted in FIG. 6B, once the hinge base plate mounting tool 163 has been selected and the offsets 202 and 203 have thus been advantageously established, the boring machine can be adjusted to bore holes 208 in the door 205 at positions corresponding to the offsets 202, 203. For example, for an inset door to be mounted with a base plate mounting tool configured for a three inch offset, the hole 208 will be bored at a vertical door offset 217 of three inches minus the desired clearance from the upper and lower edges of the door as shown in FIG. 6B. If the desired clearance is one eighth of an inch then the vertical door offset 217 to the center of the hole 208 will be two and seven eighths inches. On the other hand, if the door 205 is to be an overlay door, then the vertical door offset 217 will be the vertical offset 202 of the hinge center relative to the adjoining wall, (which in our example is three inches), plus the thickness of the adjoining wall. In this case, for a cabinet having an adjoining wall of three fourths inch thickness, the boring machine can be set to provide a vertical door offset 217 of three and three fourths inches, for example.

The boring machine can likewise be adjusted to provide the appropriate depth offset from a lateral edge of the door 205 based on whether the door is to be an inset or an overlay door 205. This depth offset for the door 205 also corresponds with the depth offset 203 from the forward edge 185, (shown in FIG. 5), of the receiving wall for which the base plate mounting tool 163 has been selected. These depth offsets 203 may be the standard 37 millimeters for overlay doors or 37 millimeters plus approximately the thickness of the door 205 as described above.

The method of the present invention which utilizes a base plate mounting tool advantageously reduces the marking and measuring required, and provides much greater accuracy for positioning and mounting hinges of the concealed or European type. Once, the base plate mounting tool has been selected based on a desired door configuration, much of the measuring, calculation, and guesswork is obviated. The result is increased speed possibilities for mounting hinges and hanging doors via those hinges. In production, this converts to greater efficiency.

Figure 7:
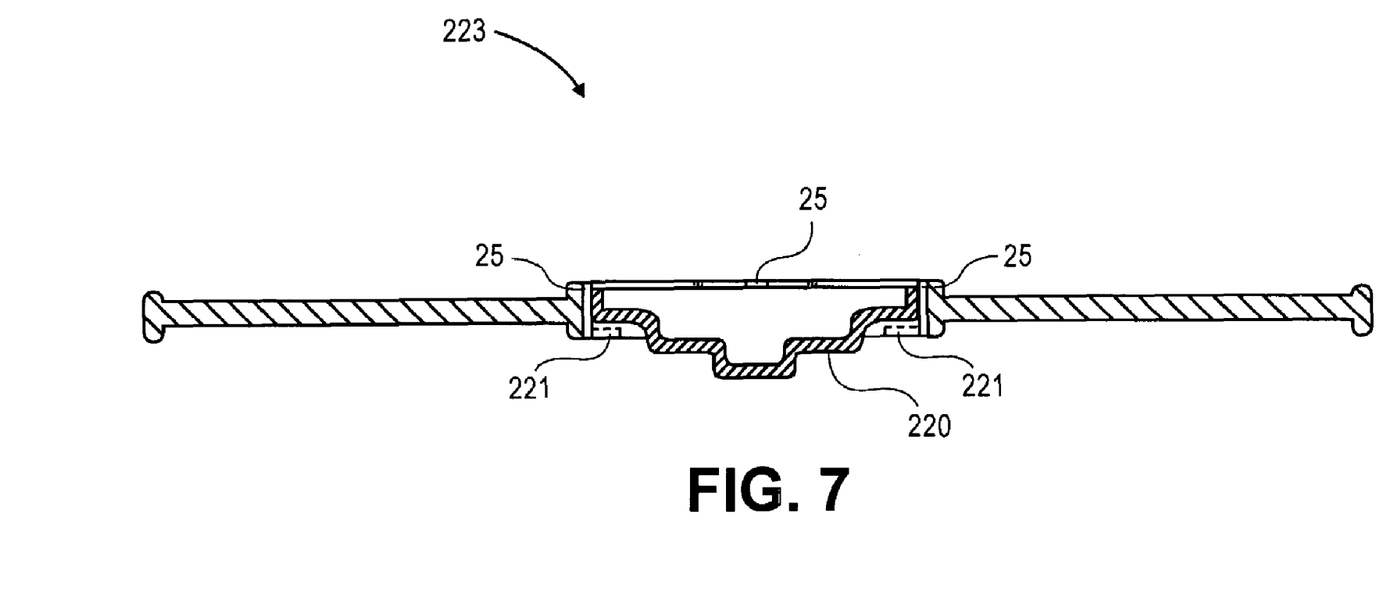
FIG. 7 is an exemplary sectional view of a hinge base plate mounting tool in accordance with a fifth embodiment and corresponding to section as taken along line 7-7 of the hinge base plate mounting tool of FIG. 1A.

The mounting tools of FIGS. 1A-4 may be configured for receiving and holding a hinge base plate 220 that is shown in an exemplary sectional view of FIG. 7 taken along line 7-7 of FIG. 1A. The hinge base plate 220 may be formed of much thinner material than base plates 100 that are of a cast type. Whereas at least portions of the hinge base plates 100 may be generally flush with the ribs surrounding the openings, the thinner hinge base plates 220 may be recessed relative to the ribs. In order to better support the thinner stamped base plates 220, the openings through the substrates may include an inwardly projecting ledge or shelf 221 that may form a step that underlies and supports outer edges of the base plate 220. This ledge or shelf 221 may be continuous along the inner wall forming the through opening, or may be intermittent. Alternatively, two or more shelves 221 may be placed at selected locations on the inner wall. In any case, the shelf or shelves 221 may function to prevent the base plate 220 from passing completely through the openings. On the other hand, the protrusions 25 may still resiliently and frictionally engage outer edges of the hinge base plate 220 and hold it against inadvertent falling out as described above. In fact, one or more additional protrusions 25 may be applied at any position along the inner wall of the opening, an example of which is indicated in a center of FIG. 7. It is to be understood that a base plate mounting tool 223 of this sort may be used to support the thicker base plates 100. Likewise, the previously described embodiments of base plate mounting tools 12, 72, 90, and 112 may be used to support the thinner base plates 220 shown in FIG. 7 because the thinner base plate 220 may be generally the same size and shape as the cast base plates 100. On the other hand, the hinge base plate mounting tool 223 of FIG. 7 may advantageously include the inwardly projecting ledge or shelf to underlie and take up excess space that may be present with at least some of the stamped base plates 220.

As is known in the art, a great deal of time may be expended in measuring and marking boards or receiving walls for mounting of base plate. Furthermore, inaccuracies are often introduced during such measuring and marking. Thus, additional time is often expended in correcting these inaccuracies. Therefore, the cost savings in time and effort provided by the hinge base plate mounting tools of the present invention, which eliminate these tedious and error prone steps, are substantial. Advantageously, the present invention enables a user to position and mount a base plate in a single step. Thus, a user no longer needs to mark the positions for drilling mounting holes in the receiving wall. Rather, the position is already established by the hinge base plate mounting tool. The base plate is held in that position during drilling and/or mounting of the base plate. The user may hold the mounting tool with one hand and drill and/or drive screws with the other hand. Then the mounting tool may be removed and the base plate is ready for connection with a rest of the hinge assembly. A person can quickly mount one base plate after another in this manner without having to stop for intermediate steps including measuring and checking for accuracy. The person or company that has and uses the mounting tools of the present invention will therefore have a significant competitive advantage over those who do not.

While the hinge base plate mounting tools of the present invention have been shown and described with regard to European or concealed hinge base plates, and in particular with regard to cruciform configurations, it is to be understood that the concepts and teachings of the present invention may be applied to other hinge assemblies and base plates that may have any of a variety of configurations. The base plate mounting tools of the present invention may be advantageously formed of any of a variety of machinable and/or injectable plastic materials including but not limited to any of a variety of ABS, styrenes, vinyls (including PVC), or polyethylenes. The tools may also be formed of thermoset resins or thermoplastics in high volume molding process(es). It is to be understood that the mounting tools could also be formed of any of a variety of other materials and in any of a variety of other ways including, but not limited to, metals, woods, or composites, by cutting, stamping, punching, molding, or any combination of such methods.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. For example, while the first and second stops are conveniently an advantageously shown and described as integrally formed and fixed with the substrates of the base plate mounting tools of the various embodiments herein, these stops may be alternatively provided as adjustable stops for permitting a user to adjust a position of one or more of the stops for a particular application. In another aspect, while most of the openings through the substrates of the present invention are not stepped in a direction transverse to the plane of the substrate and thus advantageously enable the hinge bases to be inserted from either side and/or forced all the way through the opening of the substrate, hinge base receiving portions may alternatively be provided as recesses that do not extend all the way through the substrates. Still further, while the base plate mounting tools of the present invention have been shown and described as one piece, it is to be understood that they may be formed of a plurality of pieces joined together to provide a generally similar structure and/or function as described with regard to the one piece configurations.

What is claimed is:

1. A method of mounting a concealed European hinge, comprising:
   frictionally engaging a hinge base plate within a through opening of a base plate mounting tool, wherein the hinge base plate is a hinge base plate for a concealed hinge;
   automatically positioning the hinge base plate at a predetermined depth by abutting a first stop of the base plate mounting tool against an edge of a receiving wall;
   automatically positioning the hinge base plate at a predetermined height by abutting a second stop of the base plate mounting tool with a wall that adjoins the receiving wall; and
   accurately mounting the hinge base plate by maintaining the first and second stops in abutting relation to the walls while attaching the hinge base plate to the receiving wall.

2. A method of mounting a concealed European hinge, comprising:
   frictionally engaging a hinge base plate within a through opening of a base plate mounting tool, wherein the hinge base plate is a hinge base plate for a concealed hinge;
   automatically positioning the hinge base plate at a predetermined depth by abutting a first stop of the base plate mounting tool against an edge of a receiving wall;
   positioning the hinge base plate at a predetermined height by aligning a mark on the base plate mounting tool with a mark on the receiving wall; and
   accurately mounting the hinge base plate by maintaining the first stop in abutting relation to the edge and the mark on the base plate mounting tool in aligned relation to the mark on the receiving wall while attaching the hinge base plate to the receiving wall.

3. A method of mounting a concealed European hinge, comprising:
   engaging a hinge base plate within a through opening of a base plate mounting tool, wherein the hinge base plate is a hinge base of a concealed hinge;
   automatically positioning the hinge base plate at a predetermined depth by abutting a first stop of the base plate mounting tool against an edge of a receiving wall;
   positioning the hinge base plate at a predetermined height by at least one of abutting a second stop of the base plate mounting tool with a wall that adjoins the receiving wall and aligning a mark on the base plate mounting tool with a mark on the receiving wall; and
   accurately mounting the hinge base plate by maintaining the first stop of the base plate mounting tool in abutting relation to the receiving wall and maintaining the second stop of the base plate mounting tool in abutting relation to the receiving wall or maintaining the mark on the base plate mounting tool in aligned relation to the mark on the receiving wall while attaching the hinge base plate to the receiving wall.

4. The method of claim 3, wherein engaging comprises frictionally engaging.

5. The method of claim 4, wherein frictionally engaging comprises frictionally engaging a portion of the hinge base plate with an inwardly projecting protrusion on an inner wall of the through opening.

* * * * *